United States Patent

[11] 3,575,514

[72] Inventor James W. Baker
East Lansing, Mich.
[21] Appl. No. 799,819
[22] Filed Feb. 17, 1969
[45] Patented Apr. 20, 1971
[73] Assignee FMC Corporation
San Jose, Calif.

[54] METHOD OF MEASURING TOE OF VEHICLE WHEELS WITH ENLARGED SCALE AND APPARATUS THEREFOR
10 Claims, 5 Drawing Figs.

[52] U.S. Cl. .................................................. 356/155, 33/46.2
[51] Int. Cl. ........................................................ G01b 11/26
[50] Field of Search ................................................ 356/154, 155; 350/285, 299; 33/46.2 (W)

[56] References Cited
UNITED STATES PATENTS

| | | | |
|---|---|---|---|
| 2,150,398 | 3/1939 | Paulson | 356/154 |
| 2,292,969 | 8/1942 | Peters | 356/155 |
| 2,670,660 | 3/1954 | Miller | 350/285 |
| 2,739,504 | 3/1956 | Egelsen | 356/154 |
| 2,765,701 | 10/1956 | Carrigan | 356/155 |
| 3,159,916 | 12/1964 | Hunter | 356/155 |
| 3,363,504 | 1/1968 | Lill | 356/155 |
| 3,393,455 | 7/1968 | MacMillan | 356/155 |

FOREIGN PATENTS

| | | | |
|---|---|---|---|
| 967,393 | 1950 | France | 356/155 |
| 955,610 | 1964 | Great Britain | 33/46.2 |
| 160,001 | 1964 | U.S.S.R. | 356/164 |
| 182,171 | 1963 | Sweden | 356/155 |

Primary Examiner—Ronald L. Wibert
Assistant Examiner—J. Rothenberg
Attorneys—F. W. Anderson and C. E. Tripp ABSTRACT: In measuring the toe of the front wheels of a vehicle, a projector is mounted on each wheel and aimed at a background unit in front of the vehicle. Two adjustable scales on the background unit are set so that a reference image projected from each projector hits the zero line of the scale for that wheel when the wheel is normal to the background unit. To determine the toe, the wheels are turned until one of the wheels is normal to the panel. The reference image is projected from the projector on the other wheel to a mirror on the background unit, and is reflected back to a mirror on the projector, from which it is reflected back to the adjustable scale for that wheel on the background unit. The reading on the scale, which is enlarged, gives the total toe of the vehicle wheels.

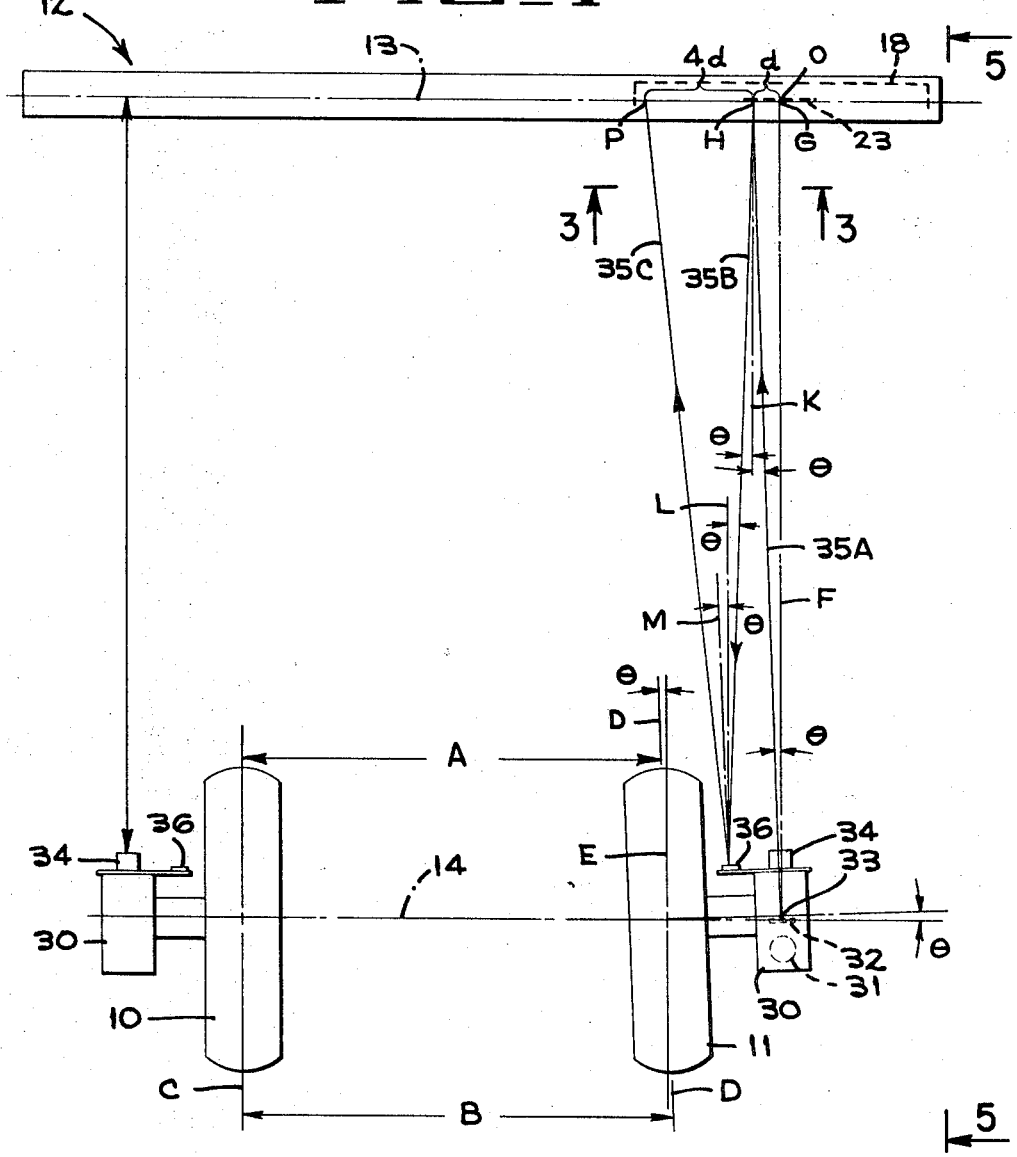
FIG_1
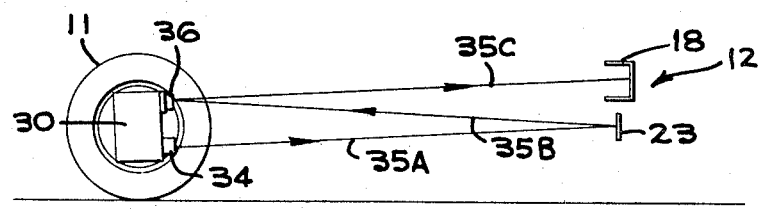
FIG_5
INVENTOR.
JAMES W. BAKER

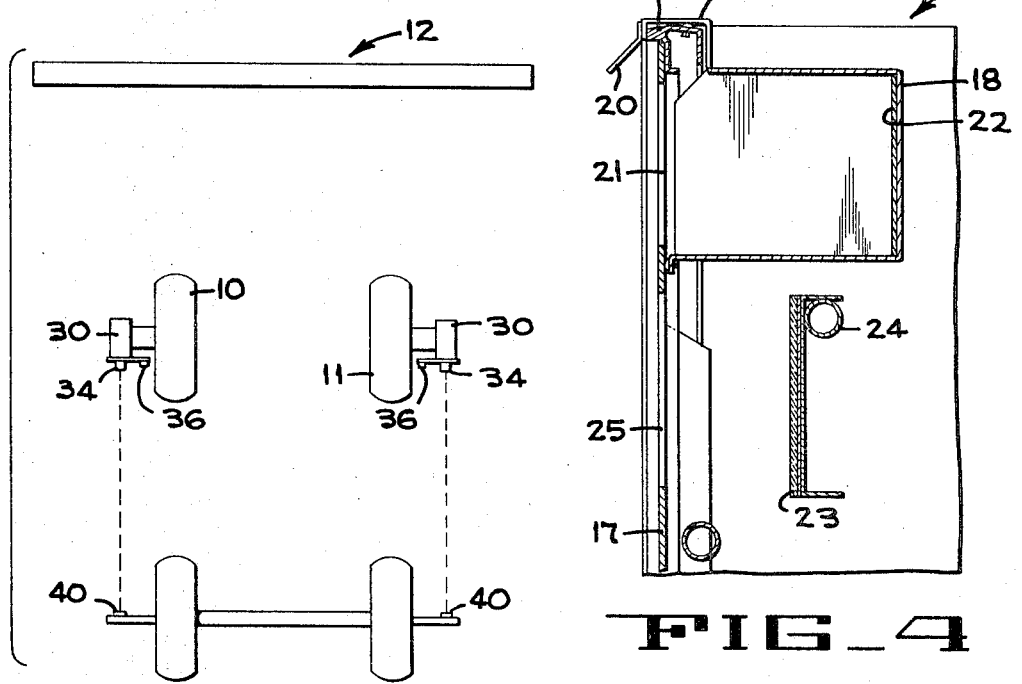
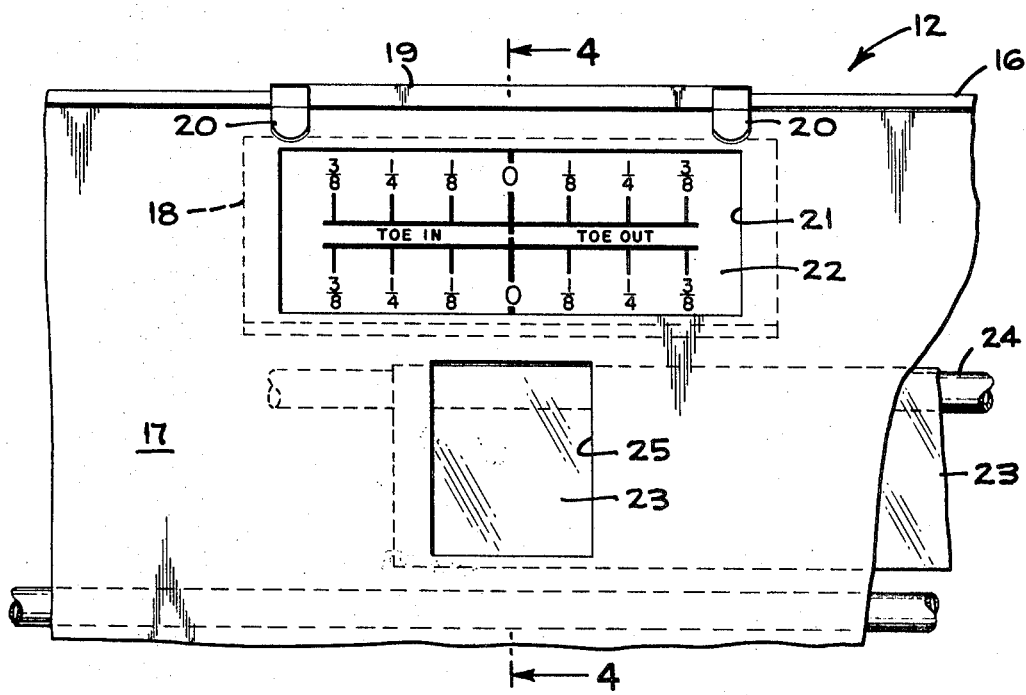

METHOD OF MEASURING TOE OF VEHICLE WHEELS WITH ENLARGED SCALE AND APPARATUS THEREFOR

BACKGROUND OF THE INVENTION

In the alignment of vehicle wheels, it is desirable to make the scales from which measurements are read as large as possible to insure accurate reading and precise adjustment. A large scale, however, requires a large movement of a reference mark, such as a projected image, as the alignment or adjustment of the wheels are changed. A large movement of the reference image, for a given adjustment of change of alignment of the wheel, requires a long path of travel for the projected image from the wheel to the scale. However, placing the scale a long distance in front of the vehicle to provide a long path of travel for the projected image makes the enlarged scale difficult to read because of the remoteness of the scale from the vehicle where the operator is adjusting or aligning the wheels.

SUMMARY OF THE INVENTION

In the present invention, there is provided a method of measuring toe on an enlarged scale, and apparatus therefor, in which the scale is not remote from the vehicle. Instead, the scale is a normal distance (say 6 feet) from the front wheels of a vehicle, but the scale is five times as large as a normal scale positioned only 6 feet from the vehicle wheels.

The method and apparatus of the present invention is illustrated in conjunction with toe measurement. In the preferred embodiment of the invention, a projector is mounted on each front wheel of the vehicle. A background unit which carries an enlarged scale is mounted a convenient distance (say 6 feet) in front of the vehicle. A mirror is mounted adjacent the scale, and a mirror is mounted on the front of the projector. A reference mark, or image, is projected from the projector along a path determined by the alignment of the wheel on which it is mounted. The projected reference mark is reflected from the mirror adjacent the scale back to the projector. The mark is then projected from the projector mirror back to the scale.

The scale is adjustably movable on the background unit so that it can be positioned with the zero mark at the point which would coincide with the projected reference mark if the wheel on which the projector casting that mark were perpendicular to the background unit bearing the scale (or perpendicular to a reference plane generally parallel to and extending through the background unit). During toe measurement, however, the opposite front wheel is set perpendicular to the reference plane so that the wheel carrying the projector which casts the reference mark is at an angle (say $\theta$ degrees) to a plane perpendicular to the reference plane.

Assume that a reference mark projected a distance of 6 feet (from projector to scale) at an angle $\theta$ from a line perpendicular to a scale having a zero mark lying on said perpendicular line, would fall a distance $d$ on the scale from said zero mark. The reference mark according to the present invention, however, will fall on the scale a distance $5d$ from the zero mark, although the scale is only 6 feet from the vehicle. This is because the reference mark is projected from projector to a mirror on the background unit to projector to scale, total distance of 18 feet. Thus, not only is the scale easily readable (since it is only 6 feet away) but, more importantly, more accurate readings and adjustments can be made because of the long path (18 feet) of the projected image.

It is therefore one object of the present invention to provide a method of an apparatus for aligning vehicle wheels in which an enlarged scale is used. It is another object of the present invention to provide, for wheel aligning, a large scale which is not remote from the operator. Another object of the present invention is to provide an improved toe-measuring method and apparatus in which a projected image travels a relatively long distance to a large scale which is positioned close to the operator.

BRIEF DESCRIPTION OF THE DRAWINGS

FIG. 1 is a plan view showing the front wheels of a vehicle in front of a background unit for wheel alignment showing projectors on the front wheels aimed at the unit;

FIG. 2 is a plan view of the vehicle of FIG. 1 showing the projectors on the front wheels aimed at targets on the rear wheels;

FIG. 3 is an enlarged, fragmentary front view of the background unit, taken on line 3—3 of FIG. 1;

FIG. 4 is a view taken on the line 4—4 of FIG. 3; and

FIG. 5 is a side view, taken on the line 5—5, of the apparatus of FIG. 1.

DESCRIPTION OF THE PREFERRED EMBODIMENT

The method and apparatus of the present invention is most suitable for measuring the toe of vehicle wheels. Toe can be defined as the difference in distance between the extreme front (distance A) and the extreme rear (distance B) of the tires at the height of the center of the wheels (see FIG. 1). There is shown in FIG. 1 the front wheels 10, 11 of a vehicle positioned in front of a background unit 12 which lies in a reference plane 13. A reference line 14 extending between the centers of the front wheels 10, 11 is parallel to the plane 13.

As shown best in FIGS. 3 and 4, the background unit 12 has a frame 16 which supports a panel 17. A shadow box 18, which is mounted on the background unit in front of each front vehicle wheel, has a clip 19 mounted over the frame, and the clip has a tab 20 attached to each end thereof. The shadow box 18 has no front face, and the panel 17 has an opening 21 in front of the shadow box to permit a projected image of reference indicia to be cast into the shadow box. A plate 22, having a toe scale marked thereon, is mounted in the back of the shadow box. A mirror 23 for each vehicle wheel is mounted in the background unit on a mirror bar 24 supported at each end by the sides of the frame 16. The two mirrors lie in reference plane 13, one in front of each of the vehicle wheels 10, 11. The mirrors lie below the shadow boxes and behind openings 25 in the panel 17.

A projector 30 is mounted on each wheel. The projector has a lamp 31 therein, and a condensing lens 32 is positioned in front of the lamp. A pointer 33 is mounted between the condensing lens 32 and a focusing lens 34 for projection of the image of the pointer along a path 35A from the projector to the background unit parallel to the plane of the wheel. A mirror 36 is mounted on the front of the projector facing the panel. The mirror is positioned on the projector so that an imaginary line M normal to the mirror surface is parallel to the path 35A of an image projected from the projector.

For purposes of illustration, assume that the plane C of the left wheel 10 of the vehicle is normal to the reference plane 13 and that the plane D of the right in is turned in (at the front) at an angle $\theta$ from a reference plane E which is normal to the reference plane 13. A reference line F from the projector of wheel 11 is perpendicular to the reference line 14 (which is parallel to the plane 13) and strikes the plane 13 at point G. The image of pointer 33, which travels the first leg between the projector and plane 13 along the path 35A at an angle $\theta$ with line F, strikes the plane 13 (or, more specifically, the mirror 23 thereof) at point H. The distance $d$ between points G and H represents the size of the scale reading if the image of pointer 33 were projected on a scale with only one leg of travel between the projector and the background unit.

However, the image of pointer 33 strikes mirror 23 and is reflected back along a second leg on path 35B to the mirror 36 on the projector. It should be noted that leg 35A is at an angle $\theta$ to an imaginary line K perpendicular to the plane 13 at H. Similarly, leg 35B is at an angle $\theta$ to line K, but on the other side thereof as the leg 35A, so the angular span between legs 35A and 35B is $2\theta$.

The image of pointer 33 strikes the mirror 36 at the projector and is reflected back to the panel to point P on a third leg defined by path 35C. The leg 35B is at an angle $\theta$ with a reference line L which extends from mirror 36 parallel to lines F and K (that is, normal to plane 13 and line 14). A reference line M from mirror 36, which is normal to the mirror 36, is at an angle $\theta$ to line L since the mirror is tilted at an angle $\theta$ to line 14. The leg 35C, which is spaced from leg 35B at twice the angle it is spaced from line M, is at an angle of $4\theta$ from leg 35B. Since the image would be at H, a distance $d$ from point G, when projected at an angle $\theta$ from normal line F, and would be at point P, a distance $4d$ from point H when reflected from point H to point P, it can be seen that a three leg pass of the image of pointer 33 will place the final image at P on plane 13, a distance $5d$ from point G. This permits use of a scale five times the size of a scale which could be used if the final image to be read was projected at H.

It is important that the scale at the panel be set so that the zero mark on the scale is positioned at point G (to indicate a zero toe) if the plane D of the wheel 11 is normal to the line 14 and plane 13. For this reason, the shadow box 18, in which the scale 22 is mounted, is slidable along the panel by pushing or pulling on the tabs 20.

In order to set the box 18 and scale 22 in the right position, the projectors are aimed at target scales 40 on the rear wheels, as shown in FIG. 2, and the front wheels are centered by turning the wheels until the images projected from the two projectors give equal readings on the two targets 40. The projectors are then aimed at the two mirrors in the panel, as shown in FIG. 1, and the bar 24 on which the mirrors are mounted is shifted horizontally, about one end or the other, until the pointer images reflected onto the projector mirror give equal readings on scales marked on the two projector mirrors. This positions the mirror bar 24 parallel to reference line 14.

The wheels are then turned until the image projected from the projector on the right wheel is reflected back to the zero mark on a scale on the projector mirror. With the wheel thus positioned, the right-hand shadow box 18 is set so that the projected pointer image falls on zero of the scale (which will be at point G of FIG. 1). Thereafter, the wheels are turned until the projected pointer image of the projector of wheel 10 is reflected back on the zero mark of the scale of that projector mirror to indicate that the wheel is normal to line 14. At that time, the total toe of the wheels can be read from the image projected by the projector of wheel 11 on the right-hand scale 22.

Although the best mode contemplated for carrying out the present invention has been herein shown and described, it will be apparent that modification and variation may be made without departing from what is regarded to be the subject matter of the invention.

I claim:

1. The method of indicating toe alignment of vehicle wheels comprising the steps of projecting an image from a front wheel of the vehicle forwardly toward a screen, reflecting said image from said screen back toward the wheel, and reflecting said image from the wheel back toward said screen, said image and said screen presenting a scale reading to indicate the amount of toe to an operator underneath the vehicle.

2. The method of indicating the toe of vehicle wheels comprising the steps of projecting an image forwardly toward a background unit from a projector mounted on a front wheel of the vehicle, reflecting said image back toward said wheel from a mirror mounted at the background unit, and reflecting said image back toward said background unit from a mirror at said projector, said image on said background unit presenting a scale reading to indicate the amount of toe to an operator underneath the vehicle.

3. The method of indicating the toe of vehicle front wheels comprising the steps of placing one front wheel and then the other front wheel perpendicular to a reference plane in front of the vehicle, projecting an image forwardly from each front wheel parallel to the wheels, adjusting a scale for each wheel in the reference plane to a predetermined position when each wheel is perpendicular to the reference plane, setting one wheel perpendicular to the reference plane, reflecting the image from the other wheel from a mirror at the reference plane back to the wheel, and reflecting said image from said other wheel back to the scale for that wheel at the reference plane to indicate the amount of toe between the wheels to an operator underneath the vehicle.

4. The method of indicating the toe of vehicle front wheels comprising the steps of placing one front wheel and then the other front wheel perpendicular to a reference plane, projecting a reference mark forwardly along a path parallel to each wheel from a projector on the respective wheels, adjusting a movable scale for each wheel at the reference plane to set the zero mark of the scale for each wheel at the reference mark projected from that wheel when the respective wheels are perpendicular to the reference plane, setting one wheel perpendicular to the reference plane, reflecting the reference mark from the projector on the other wheel from a mirror at the reference plane back to the projector from which it was projected, reflecting the reference mark from a mirror on the projector back to the scale at the reference plane to give an enlarged toe reading visible to an operator underneath the car.

5. Apparatus for indicating the toe of vehicle front wheels comprising a projector mounted on a front wheel to project a reference mark forwardly, a first mirror in front of the vehicle positioned to reflect the reference mark back to the projector, a second mirror at the projector to reflect the reference mark back toward the first mirror, and a marked surface at the first mirror to receive the projected reference mark, said reference mark and said marked surface giving a scale reading indicating the extent of toe to an operator underneath the vehicle.

6. The apparatus of claim 5 in which said marked surface is movable for setting.

7. Apparatus for indicating the toe of vehicle front wheels comprising a projector mounted on each front wheel to project a reference mark forwardly, a first mirror in front of each projector, said first mirrors positioned to reflect the reference marks back to the projector from which they were projected, a second mirror at each projector to reflect the reference marks back toward the respective first mirrors, and an adjustable marked surface adjacent each of said first mirrors to receive the projected reference mark, said reference mark on said marked surface giving a scale reading to an operator underneath the car.

8. Apparatus for measuring the toe of vehicle front wheels comprising a projector mounted on one of the wheels to project a reference mark forwardly, a background unit mounted in front of the projector, a first mirror mounted in the background unit to reflect the reference mark back to the projector, a second mirror mounted on the projector to reflect the reference mark back toward the first mirror, and a marked surface at the background unit to receive the projected reference mark said reference mark on said marked surface giving a scale reading indicating the extent of toe to an operator underneath the vehicle.

9. The apparatus of claim 8 in which said marked surface is adjustably movable in the background unit.

10. Apparatus for measuring the toe of vehicle front wheels comprising a projector mounted on each front wheel to project a reference mark forwardly, a background unit extending in front of the projectors, a first mirror mounted on the background unit in front of each projector, said first mirrors positionable to reflect the reference marks back to the projector from which they were projected, a second mirror mounted on each projector to reflect the reference marks back toward the respective first mirrors, and an adjustable marked surface mounted on the background unit adjacent each of said first mirrors to receive the projected reference mark, said reference mark on said marked surface giving a scale reading to an operator underneath the car.